July 31, 1928.  1,679,066
F. STUMP ET AL
STATION INDICATOR
Filed April 2, 1926   4 Sheets-Sheet 1
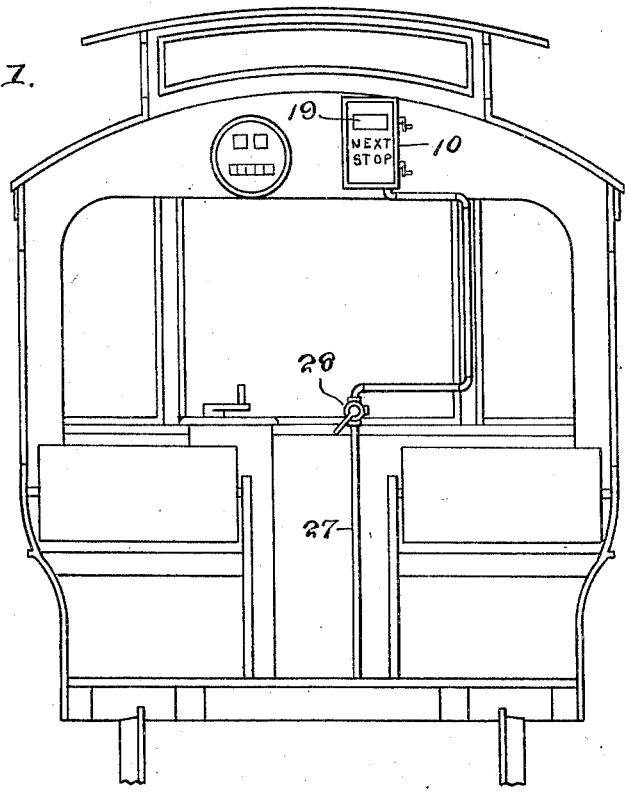
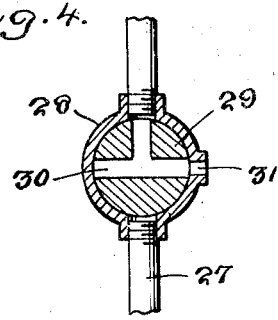
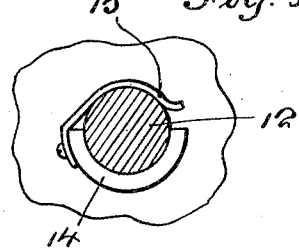
Frank Stump
Arthur A. Johnston
INVENTOR
By Victor J. Evans
ATTORNEY July 31, 1928.

F. STUMP ET AL 1,679,066

STATION INDICATOR

Filed April 2, 1926

Frank Stump
Arthur H. Johnston INVENTOR

BY Victor J. Evans
ATTORNEY

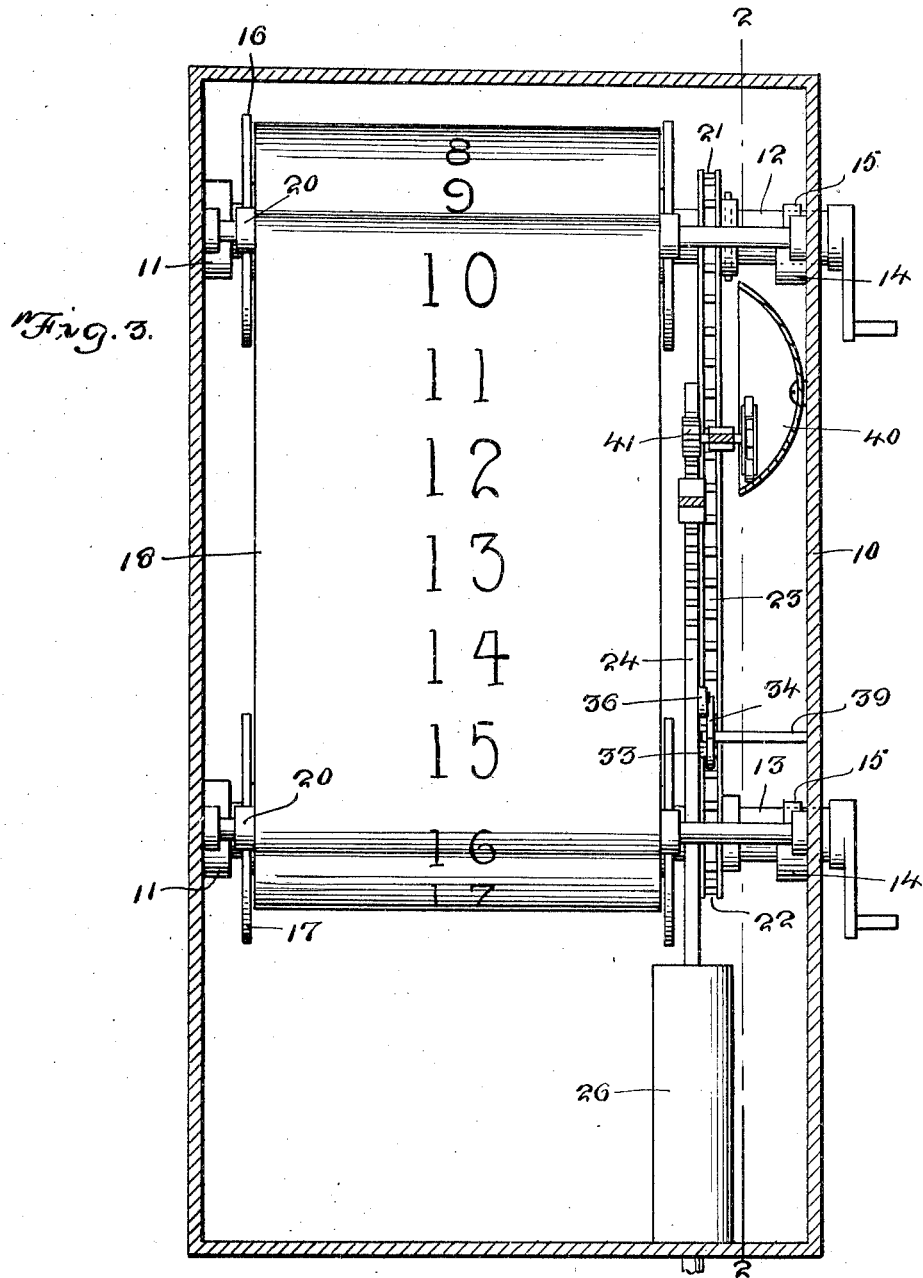

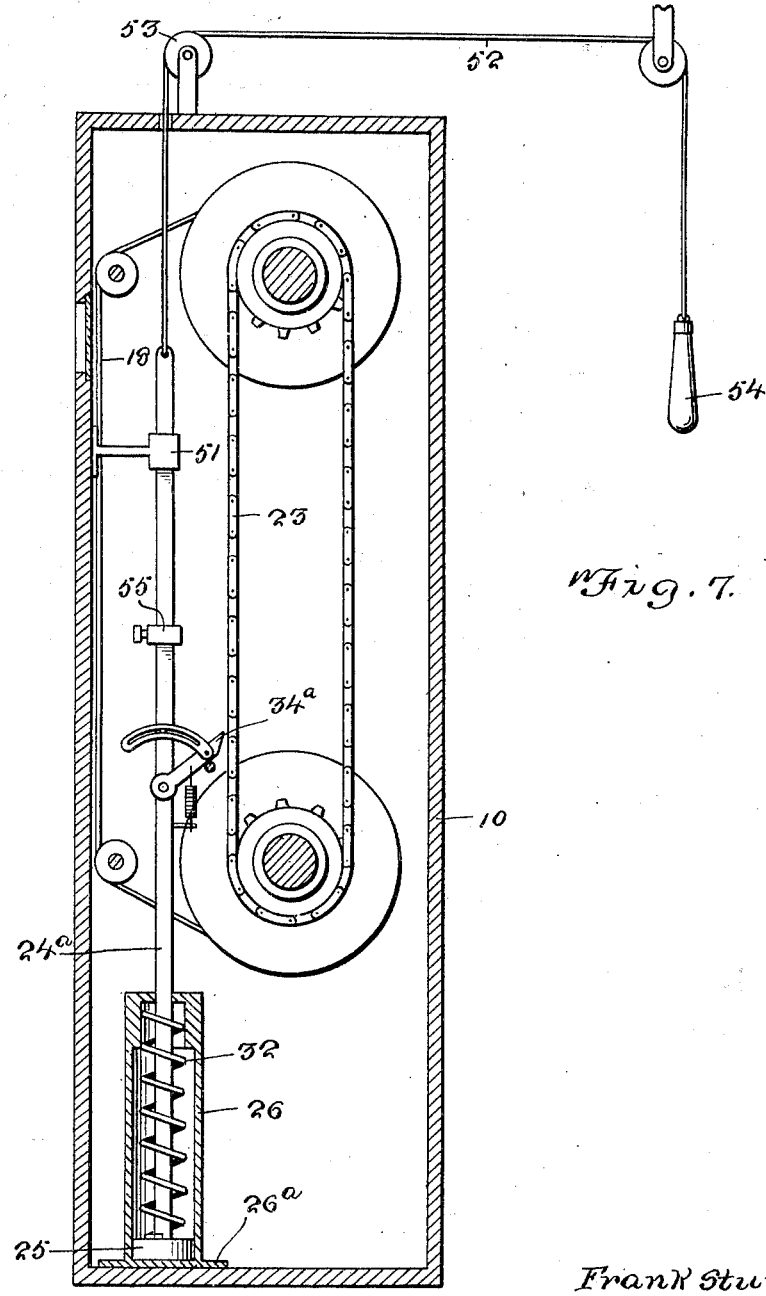

Patented July 31, 1928.

1,679,066

UNITED STATES PATENT OFFICE.

FRANK STUMP AND ARTHUR A. JOHNSTON, OF MORGANTOWN, WEST VIRGINIA.

STATION INDICATOR.

Application filed April 2, 1926. Serial No. 99,360.

This invention relates to improvements in station indicators and has for an object the provision of means designed for use within cars, busses and similar public vehicles, to indicate an approaching street or station.

Another object of the invention is the provision of novel means for operating the indicator so as to insure positive movement of the parts and permit of the indicator being conveniently reset when desired.

With the above and other objects in view, the invention further includes the following novel features and details of construction, to be hereinafter more fully described, illustrated in the accompanying drawings and pointed out in the appended claims.

In the drawings:—

Figure 1 is an end view illustrating a car with the invention applied.

Figure 3 is a section on the line 3—3 of Figure 2.

Figure 4 is an enlarged fragmentary section of the controlling valve.

Figure 5 is an enlarged fragmentary view showing one of the bearings.

Figure 7 is a vertical sectional view illustrating another form of the invention.

Figure 2:
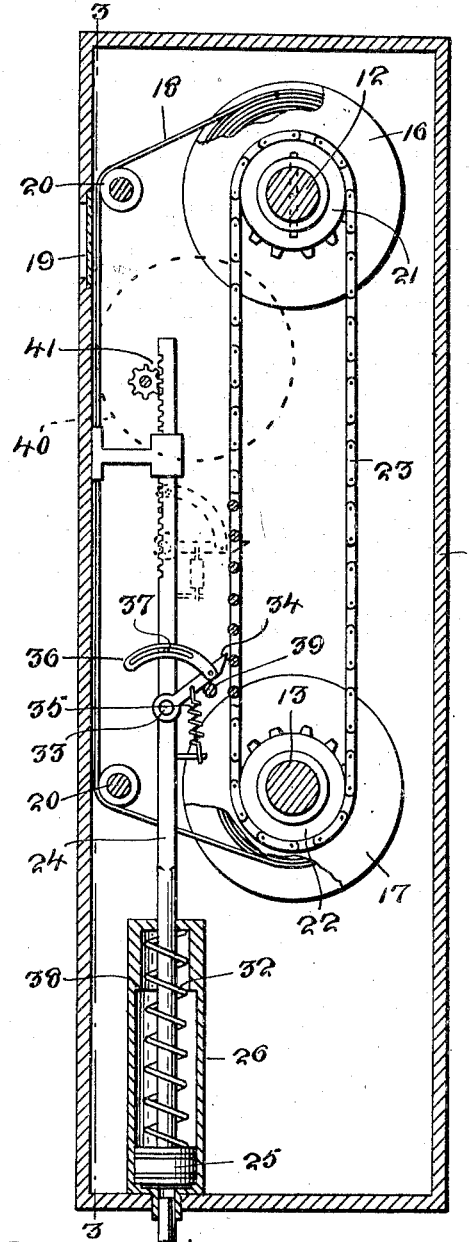
Figure 2 is a vertical sectional view of the indicator per se, the section being indicated by the line 2—2 on Figure 3 of the drawings.

Referring to the drawings in detail wherein like characters of reference denote corresponding parts, the indicator as shown comprises a housing 10 of suitable construction. This housing is provided with spaced bearings 11 for receiving shafts 12 and 13. The bearings 11 are formed of socketed members which receive one end of the shafts 12 and 13, while the opposite ends of the said shafts are supported in substantially semi-circular bearings 14 and are engaged by spring fingers 15 carried by the bearings 14. The shafts 12 and 13 may thus have one of their ends slipped into the bearings 11 while their opposite ends are forced beneath the fingers 15, the latter acting as retaining fingers and also yieldingly resisting rotation of the shafts. Flanged rollers 16 and 17 are mounted upon the shafts 12 and 13 respectively and are designed to have wound thereon an indicating strip 18. The strip 18 is adapted to have imprinted or otherwise placed thereon, indicia to indicate the name of an approaching street or station and is designed to be guided behind a glass covered sight opening 19 by means of rollers 20. Any suitable means may be provided for securing the opposite ends of the strip 18 to the rollers 16 and 17, the strip being designed to be initially wound upon the roller 17 and unwound from said roller upon the roller 16 during the operation of the indicator. The space between the street or station indicating indicia is successively increased so as to provide for the increased diameter of the roller 16 as the strip is wound thereon. Thus, the indicia will be properly presented behind the opening 19.

Fast upon the shaft 12 is a sprocket wheel 21 which is connected to a sprocket wheel 22 by means of a chain 23, the wheel 22 being loose upon the shaft 13.

Slidingly mounted within the casing 10 is a longitudinally movable rod 24. This rod may be actuated by any suitable means. The means illustrated consists of a plunger 25 which operates within a cylinder 26. This plunger is preferably operated by compressed air conducted from a suitable source through a pipe 27, passage of air into the cylinder 26 being controlled by a three-way cock 28. This cock is illustrated in detail in Figure 4 of the drawings and comprises a rotatable member 29 having right angularly disposed passages 30 therein and an exhaust port 31. By reference to Figure 4 of the drawings it will be seen that the member 29 may be positioned to permit air to pass from the pipe into the cylinder 26, or to exhaust air from said cylinder so that the piston after its operation may be returned to normal position. Movement of the piston under the pressure of air is resisted by a spring 32.

Pivotally mounted upon the rod 24 as indicated at 33, is a dog 34, a spring 35 serving to move the dog in one direction. Secured to the dog 34 is one end of an arcuate shaped slotted arm 36 which receives a pin 37 carried by the rod 24 so that pivotal movement of the dog in one direction is limited. The outer end of the dog 35 is beveled and by reference to Figure 2 of the drawings it will be seen that when air is admitted to the cylinder 26 and the rod 24 moved upward, the spring 35 will pull the dog downward so that its beveled end will engage between the links of the chain 23. This movement will be resisted when the pin 37 is engaged by the end of the arm 36. Continued upward movement of the rod 24 will carry the chain with it and will rotate the shaft 12 and wind thereon a portion of the strip 18. The length of movement of the rod 24 is limited by the engagement of the plunger 25 with a shoulder 38 provided in the cylinder 26, this movement being sufficient to move the strip 18 one space. When the air is exhausted through the port 31, the spring 32 will return the rod to its normal position, the beveled end of the dog 34 riding downward over the links of the chain 23. When the rod reaches its normal or lowermost position, the dog will be engaged by a pin or stop 39 and will be disengaged from the chain as shown in Figure 2 of the drawings.

If desired, a bell or gong 40 may be provided which is operated by a rack and pinion 41, the rack being formed upon the bar 24. This alarm will thus serve to indicate a proposed change in the indicator mechanism.

Figure 6:
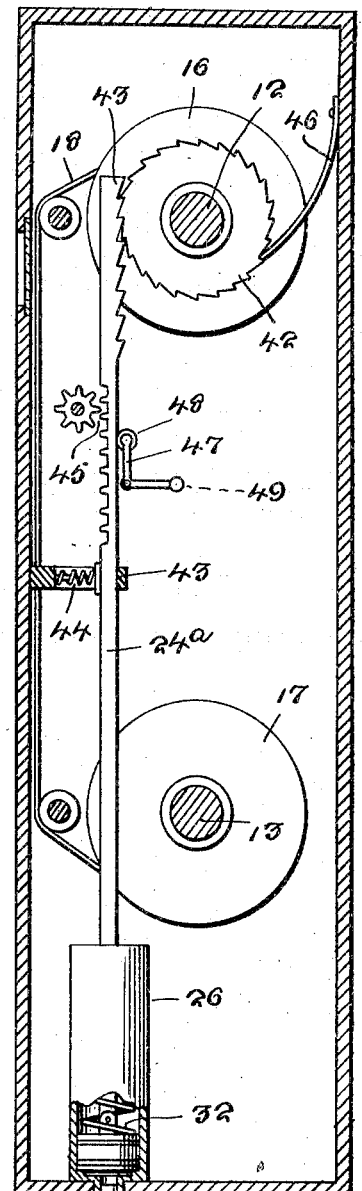
Figure 6 is a view similar to Figure 2 but showing a slightly different form of the invention.

In Figure 6 of the drawings, the shaft 12 has secured thereon a toothed wheel 42 which is designed to be engaged by teeth 43 provided upon the longitudinally movable rod 24ª. This rod is guided through a bearing 43 and is held yieldingly against the wheel 42 by a spring 44. The rod 24ª is also provided with a rack and pinion connection 45 for the operation of an alarm. A spring dog 46 serves to prevent retrograde motion of the roller 16.

The rod 24ª is operated by the pressure of air in the cylinder 26, as previously described and is returned to its normal position by the spring 32. When the rod is moving downward, the teeth 43 will ratchet over the teeth of the wheel 42. When it is desired to reset the strip 18, the teeth 42 and 43 are disengaged by means of a substantially L-shaped arm 47 whose end 48 is designed to engage the rod 24ª and push the latter against the action of the spring 44 when the arm 47 is rocked. A handle 49 is provided upon the outside of the casing for convenience of operation.

In the form of the invention illustrated in Figure 7, the cylinder 26 which is positioned within the housing 10, is provided with an integral flange or base 26ª secured to the bottom of the housing 10. The plunger 25 which operates within this cylinder is yieldingly forced downward by the spring 32 and is provided with a rod 24ª which extends upwardly through a guide 51 secured within the housing. The plunger rod 24ª carries the spring actuated dog 34ª which engages the sprocket chain 23 so as to rotate the rollers after the manner described and shown in Figure 2 of the drawings.

Secured to the upper end of the rod 24ª is a cord or cable 52 which passes over guide rollers 53 and is provided at its outer end with an operating handle 54, the latter being designed to be arranged within convenient reach of a motorman or other railway employee.

A pull upon the cord 52 will actuate the indicator strip 18, the plunger 25 being returned to its normal position by the spring 32 as previously described. Upward movement of the plunger is limited by a collar 55 which is adjustably mounted upon the rod and which is designed to engage the guide 51.

The invention is susceptible of various changes in its form, proportions and minor details of construction and the right is herein reserved to make such changes as properly fall within the scope of the appended claims.

Having described the invention what is claimed is:—

1. A station indicator comprising a casing having a sight opening therein, spaced rolls, an indicator strip having indicia thereon and adapted to be wound upon the rolls behind the sight opening, a chain and sprocket drive for the rolls, a longitudinally movable rod, normally disengaged pivotally mounted means carried by the rod and engageable with the sprocket chain when the rod is moved in one direction to drive said chain and rotate the rolls, means to actuate the rod, a stop located in the path of the chain engaging means to hold the latter disengaged from said chain when the rod is in normal position, a spring to move the chain engaging means into active position and means to limit pivotal movement of the chain engaging means when the latter is in active position.

2. A station indicator comprising a casing having a sight opening therein, spaced rolls, an indicator strip having indicia thereon and adapted to be wound upon the rolls behind the sight opening, a chain and sprocket drive for the rolls, a longitudinally movable rod, a dog having one end pivotally secured to the rod and its opposite end arranged to engage the chain, a spring connecting the rod and dog to cause said dog to engage the chain and move the latter when the rod is moved in one direction, a plate having one end secured to the dog and having a sliding connection with the rod to limit pivotal movement of the dog, means to actuate the rod, a signal and means controlled by the rod to operate the signal at each operation of said rod.

3. A station indicator comprising a casing having a sight opening therein, spaced rolls, an indicator having indicia thereon and adapted to be wound upon the rolls behind the sight opening, a chain and sprocket drive for the rolls, a longitudinally movable rod, a spring actuated dog pivotally mounted upon the rod and adapted to engage the chain when the rod is moved in one direction, means secured to the dog and engaging the rod to limit pivotal movement of the dog and means to prevent engagement of the dog and chain when the rod is in normal position.

In testimony whereof we affix our signatures.

FRANK STUMP.
ARTHUR A. JOHNSTON.